United States Patent
Liebert

(10) Patent No.: US 8,052,193 B2
(45) Date of Patent: Nov. 8, 2011

(54) DEVICE IN A PART OF A MINING OR CONSTRUCTION VEHICLE INCLUDING A WEAR PROTECTION STRUCTURE AND A PART INCLUDING SUCH A DEVICE

(75) Inventor: Alex Liebert, Glanshammar (SE)

(73) Assignee: Atlas Copco Rock Drills AB, Orebro (SE)

( * ) Notice: Subject to any disclaimer, the term of this patent is extended or adjusted under 35 U.S.C. 154(b) by 325 days.

(21) Appl. No.: 12/226,335

(22) PCT Filed: Apr. 18, 2007

(86) PCT No.: PCT/SE2007/000369
§ 371 (c)(1),
(2), (4) Date: Oct. 15, 2008

(87) PCT Pub. No.: WO2007/129947
PCT Pub. Date: Nov. 15, 2007

(65) Prior Publication Data
US 2009/0278372 A1    Nov. 12, 2009

(30) Foreign Application Priority Data
May 5, 2006  (SE) .................................... 0601006

(51) Int. Cl.
*B62D 33/02*  (2006.01)
(52) U.S. Cl. .................... 296/39.1; 296/39.2; 296/183.1
(58) Field of Classification Search ............... 296/183.1, 296/39.1, 39.2; 37/451; 105/423
See application file for complete search history.

(56) References Cited

U.S. PATENT DOCUMENTS

| | | | |
|---|---|---|---|
| 4,128,271 A | | 12/1978 | Gray |
| 5,803,531 A | * | 9/1998 | Nielsen .................. 296/184.1 |
| 5,851,043 A | * | 12/1998 | Moutrey et al. ............ 296/39.2 |
| 6,000,741 A | * | 12/1999 | Reynolds et al. ........... 296/39.2 |
| 6,007,132 A | * | 12/1999 | Burg et al. ................ 296/39.2 |
| 6,129,409 A | | 10/2000 | D'Amico |
| 6,174,013 B1 | * | 1/2001 | Nicholl et al. ............ 296/39.1 |
| 6,174,014 B1 | | 1/2001 | Hook et al. |
| 6,305,731 B1 | * | 10/2001 | Hook et al. .................. 296/39.2 |

(Continued)

FOREIGN PATENT DOCUMENTS

RU      2032558      4/1995

(Continued)

OTHER PUBLICATIONS

Translation of the Derbasov et al. reference, FLS. Inc, Aug. 2011.*

*Primary Examiner* — Jason S Morrow
(74) *Attorney, Agent, or Firm* — Mark P. Stone

(57) ABSTRACT

A device in a part (1, 24) of a mining or construction vehicle having a wear protection structure (3-9, 14, 25, 27), forming a portion of the part that is subjected to wear from abrasive material during loading or dumping. The wear protection structure has grooves (10-12, 15, 26, 28) having an extension extending at an angle to a general movement direction of abrasive material against the wear protection structure during loading or dumping. The wear protection structure is positioned on the part so that abrasive material passes it during loading and/or dumping. The grooves are widened towards an outer surface of the wear protection structure.

10 Claims, 3 Drawing Sheets

U.S. PATENT DOCUMENTS

| | | |
|---|---|---|
| D458,209 S | 6/2002 | Darbishire |
| 6,799,385 B2 * | 10/2004 | Champney ....................... 37/451 |
| 6,854,808 B2 * | 2/2005 | Kostecki ........................... 298/7 |
| 7,059,647 B1 * | 6/2006 | Sierakowski et al. ........ 296/39.1 |
| 2010/0143742 A1 * | 6/2010 | Tsypine et al. ................ 428/600 |

FOREIGN PATENT DOCUMENTS

| | | |
|---|---|---|
| RU | 2106275 | 3/1998 |
| SU | 1311963 A1 * | 5/1987 |
| WO | WO 98/23466 | 6/1998 |
| WO | WO 9823466 | 6/1998 |
| WO | WO 2006035155 | 4/2006 |

* cited by examiner

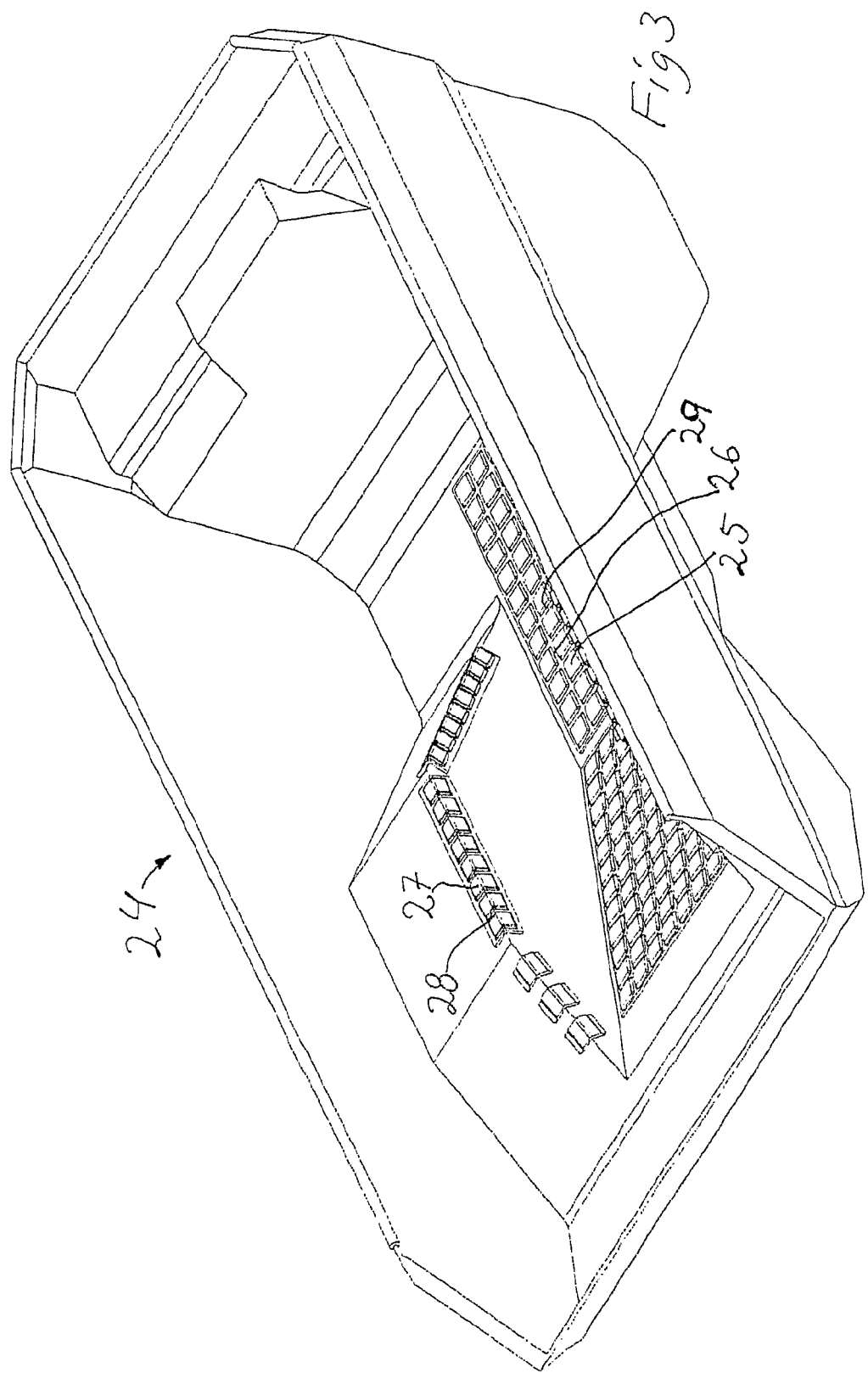

DEVICE IN A PART OF A MINING OR CONSTRUCTION VEHICLE INCLUDING A WEAR PROTECTION STRUCTURE AND A PART INCLUDING SUCH A DEVICE

FIELD OF THE INVENTION

The invention concerns a device in a part of a mining or construction work vehicle according to the preamble of claim 1. The invention also concerns a part including such a device.

BACKGROUND OF THE INVENTION

Wear parts, buckets and loading platforms for mining or construction machines are subjected to heavy wear from abrasive material during the process of loading and unloading.

In order to increase the wear-resistance of loading buckets, bucket teeth with considerable dimensions are used which are fastened to the parts of the loading buckets which are most subjected to wear, such as typically the front edge of a loading bucket. It is also previously known to reinforce other parts of loading buckets as well as loading platforms for dumpers and other construction work vehicles.

Teeth for loading bucket, however, add to the weight of the bucket and the corresponding applies to wear material for loading platforms. Because of this, also possible weight of loaded material in the bucket as well as on the loading platform is reduced.

Further, today's bulky bucket teeth results in that higher resistance occurs when penetrating a pile of material to be loaded. The building height of a loading bucket tooth can very well be more than three the times height of the bucket lip itself.

U.S. Pat. No. 6,174,014 describes a liner for a work machine body, wherein gaps are left between interfitting portions to define openings through the liner. The openings cause material ejected across the liner to tumble, thus reducing the abrasive wear. This described liner is complicated and has proved less effective. It is further only possible to use in limited applications.

Aim and Most Important Features of the Invention

The aim of the present invention is to avoid or at least reduce the problems of the background art and to provide a device of the kind indicated above, which makes it possible to achieve a weight reduction as well as an enhanced resistance against wear.

According to the invention these aims are achieved in a device as mentioned above through the features of the characterizing portion of claim 1.

When pieces, in particular smaller parts of rock or other material to be loaded penetrates into and are hooked against edges, protrusions etc. of the grooves at the inside/upside of the details, in particular of the bucket and the loading platform respectively, as well as the bucket teeth, they are given a "rolling" effect against the wear protection structure. The material that comes into contact with the wear protection structure will thereby at least partially roll on the structure. Rolling stones, crushed material, blasted pieces etc. wear less on the wear protection structure and the rest of the bucket than sliding material would do, wherefore the result will be reduced wear.

The transversal cavities in the form of grooves thus imparts rolling of certain parts of the material to be loaded and dumped by edges etc. getting caught in the cavities.

As a result, the wear protection can be made with smaller dimensions and thereby with reduced weight compared to conventional material having the same resistance against wear. Of course, the presence of grooves in the material results in that the wear protection will be lighter, whereby the amount of loaded material can increase and the wear protection be less expensive to produce.

According to the invention it has been realized that in a device according to U.S. Pat. No. 6,174,014, it is likely that after a certain time of use with handling of material of certain size, material pieces get permanently stuck in the gaps, thereby reducing the function, since the edges of the gaps are likely to be covered.

In particular therefore, according to the invention, the grooves are widening against the outer surface of the wear protection structure. Hereby it is achieved that material loosens more easily from the grooves, whereby they are kept free from otherwise more or less permanently clogging material. The edges of the grooves are hereby kept free for more effective function of engagement with passing rock pieces for imparting them the rolling effect.

Another important difference from U.S. Pat. No. 6,174,014 is that in the device according to the invention the entire grooves including the groove walls and bottom are defined by the wear protection structure. This results in a stronger structure with more foreseeable properties.

Said grooves or cavities should form an almost right angle to said general movement direction and the effect is very good when the angle is about 75-90° to said direction.

It is preferred that the grooves are widening against the outer surface of the wear protection structure, and an open angle of between about 70° and about 120° gives a good combination of retention, in order to impart rolling, and strength of the wear protection structure.

The device according to the invention is applicable in respect of different parts, as for example: a tooth of a loading bucket, a tooth of a digging bucket, a wear protection unit for a bucket, a wear protection unit for a loading platform, a loading bucket, a digging bucket, a loading platform of a mining or construction machine.

BRIEF DESCRIPTION OF DRAWINGS

The invention will now be described in greater detail at the background of embodiments and with reference to the annexed drawings, wherein:

FIG. 3 shows a loading platform for a mining or construction machine provided with a wear protection structure according to the invention.

DESCRIPTION OF EMBODIMENTS

Figure 1:
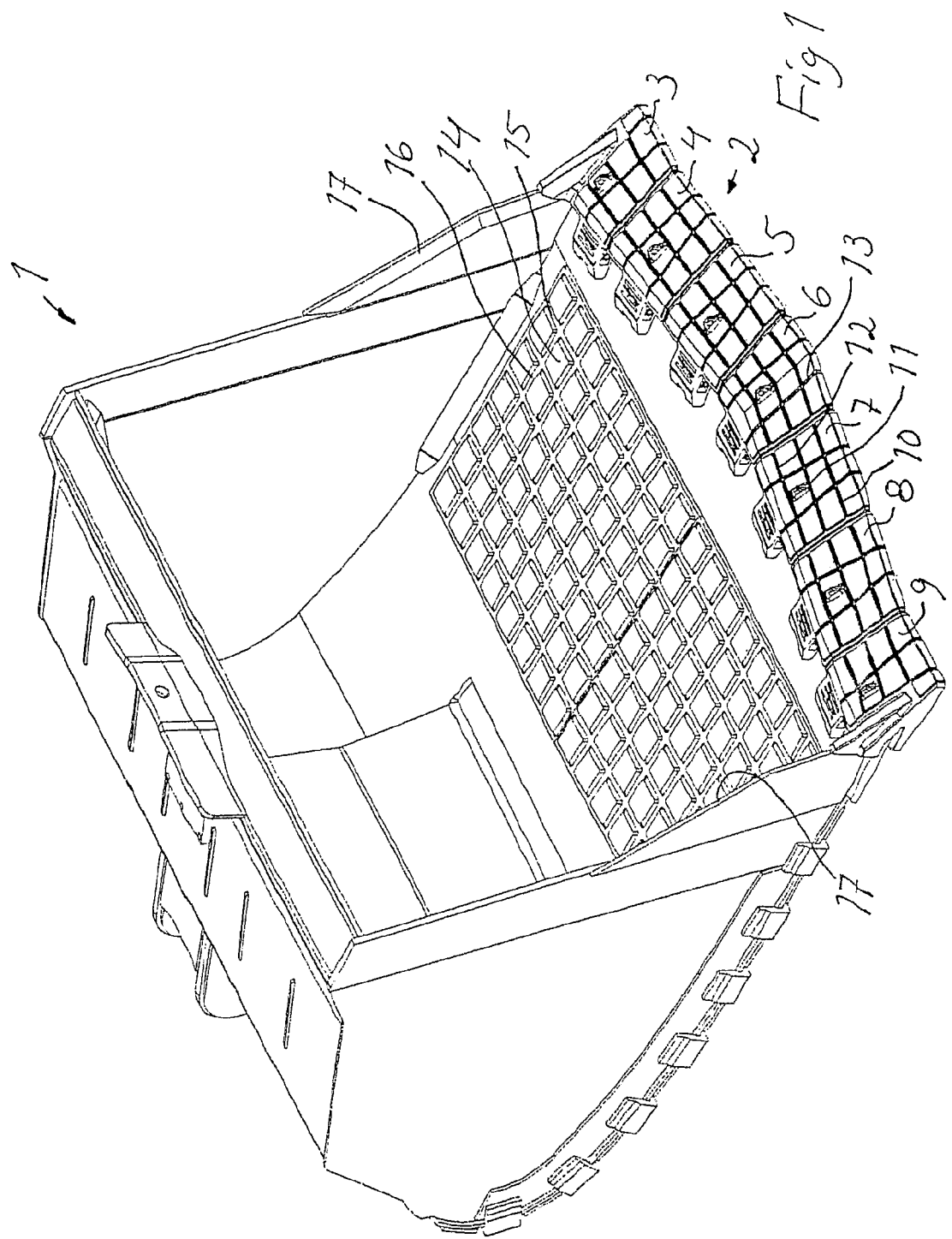
FIG. 1 shows a loading bucket provided with devices for wear protection according to the invention, FIGS. 2a and b show different transverse sections for grooves in wear protections according to the invention.

The loading bucket 1 shown in FIG. 1 for a mining vehicle is provided with two types of wear protections structures according to the invention. In the area of the lower engagement edge of the loading bucket, which in use penetrates a heap of material to be loaded, there are arranged bucket teeth 3-9 positioned adjacent to each other, which are fixed to the bucket in a way that is not a subject to this invention and therefore not described further here.

The teeth 3-9 are formed with transversal grooves 10, 11 and 12, as seen in a penetration direction for the loading bucket. Further there are arranged a number of grooves (one indicated at 13), which extend essentially in said penetration direction.

The bucket 1 is further provided with a wear protection structure 14 in the form of a plurality of plain protrusions, which are separated by a first group of grooves (one indicated at 15), which extend essentially transversal to said direction, whereas a second group of grooves (one shown at 16) extend essentially in parallel with said direction.

The wear protection structure 14 is suitably welded to the bottom plate of the bucket.

Through the shown construction, material being present above the engagement edge and the bottom of the bucket will during a forward movement of the bucket be imparted a rolling action on at least some parts of the material, because of the elaboration according to the invention.

This will occur because edge portions, protruding parts etc. of stones, pieces of ore, pieces of rock and the like will protrude down into the transversal grooves 10, 11 and 12 and 15, respectively, in order thereby to hold against an inside edge of said groove such that the rock pieces etc. tumble or are imparted a rolling action against the wear structure. Hereby wear will decrease, because rolling pieces will function as "lubricant" for the bucket during its penetration into the material. A reduction of the penetration force necessary for engagement in a material heap can also be expected for the mentioned reason.

Also other parts of the bucket, such as side edges 17 can be provided with structures according to the invention.

Figure 2A:
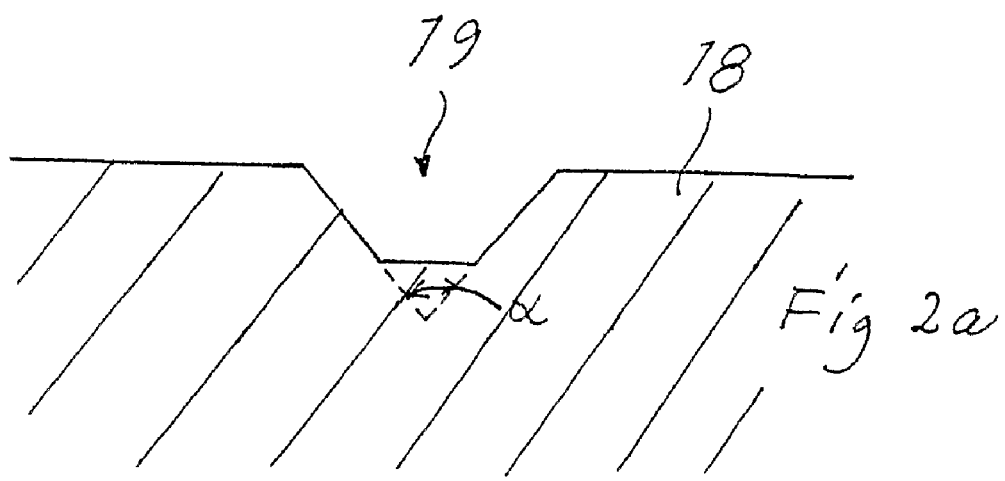

FIG. 2a shows a detail of a wear protection structure 18 in section with a cross section through the area of a groove 19, which has an essentially trapezoidal shape with an upwardly open angle α of as an example between about 70° and 120°. With an angle of α in the area between about 80 and 100°, i.e. that each flank of the groove forms about 45° to the wear protection surface, a preferred good effect is obtained.

As examples of dimensions could be mentioned that groove depths of between about 5 and 15 mm and groove widths between about 3 mm and about 30 mm have been proved to function very well in normal applications. Also other dimension can of course come into question, in particularly for loading of coarse-grained goods when greater groove dimensions can come into question, or when handling more fine-grained goods, when smaller groove dimensions comes into question.

Figure 2B:
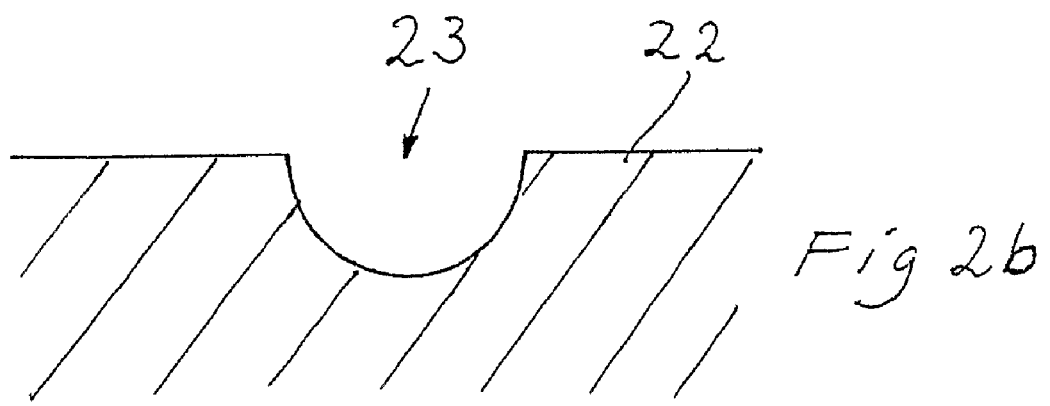

FIG. 2b shows another groove variant with partly circular groove cross section 23 in a wear protection structure 22.

FIG. 3 shows a loading platform of a loader for use in a mine, wherein the bottom of the loading platform is provided with a wear protection structure 25, which is structured in a manner corresponding to the wear protection structure 14 in FIG. 1.

27 indicates a further construction wherein wear protection elements are mounted on an edge in such a way that there are grooves 8 present between neighbouring wear protection elements.

In respect of the loading platform 24 and the bottom of the bucket, the respective protection structures 25 and 14 will function in a manner corresponding to the structure of the bucket teeth. I.e. during dumping or loading, a lubricating effect will be obtained by imparting rolling of rock pieces etc., which have portions that engage into grooves between different wear protection elements.

The invention can be modified within the scope of the following claims, and as an example the grooves can extend over only part of the entire width of the scope, the loading platform etc. They can here be oblong structures positioned essentially perpendicular to a movement direction of material to be loaded etc. The grooves that are shown on FIGS. 1 and 3 are located essentially in a loading or engagement direction and are not necessary for the function on the invention. Instead they have merely a weight saving function. It should thus be possible to omit grooves 13 and 16 in FIG. 1 and the longitudinal grooves exemplified with groove 29 in FIG. 3.

The distance between grooves can be in the region between 100 mm and 200 mm and depends i.a., on expected size of material to be loaded. The material in the wear protection structure can be different steel compositions such as for example hard steel alloy including tungsten. Forged steel, cast steel, rolled steel etc. can also be used.

Different portions of the parts can be provided with wear protection structures according to the invention. It should, however, be stressed that it is the question of an inner side/an upper side of the part, where material being loaded and/or dumped comes into movement against the surfaces of the part. It could hereby be necessary to make an analysis of the portions of a bucket etc. that is subjected to wear from such material, and the magnitude of the wear, before it is determined where the wear protection structure is to be positioned. For example, in a bucket according to FIG. 1, the wear protection on the bottom plate can be omitted and to the side portions can be added wear protection structures.

The invention claimed is:

1. Device in a part (1, 24) of a mining or construction vehicle including a wear protection structure (3-9, 14, 25, 27), which is intended to comprise a portion of the part that is subjected to wear from abrasive material during loading or dumping, and which is provided with cavities, wherein said wear protection structure is positioned such on the part that said abrasive material passes it during loading and/or dumping characterized in
that said wear protection structure has cavities in the form of grooves (10-12, 15, 26, 28) having an extension that extends at an angle to a general movement direction of abrasive material against the wear protection structure during said loading or dumping,
that said grooves are widening towards an outer surface of the wear protection structure,
that the extension of said grooves forms an angle of between about 75-90° with said general movement direction, and
that said wear protection structure is made from a material from the group: forged steel, cast steel, rolled steel, and hard alloy steel.

2. Device according to claim 1, characterized in that said grooves have a transversal sectional shape from the group: trapezoidal, triangular, rounded, part circular.

3. Device according to claim 2, wherein said grooves have trapezoidal, or part circular cross sectional shape, characterized in that said grooves are widening such that at least an outer portion of the groove forms an open angle of between about 70 and 120°.

4. Device according to claim 1, characterized in that said grooves are positioned along a line adjacent each other on the surface of the wear protection structure.

5. Device according to claim 1, characterized in that it includes a first group of essentially parallel first grooves, the extension of which forming an angle to essentially parallel second grooves belonging to a second group.

6. Device according to claim 1, characterized In that it is Included in a part from the group: a tooth of a loading bucket, a tooth of a digging bucket, a wear unit of a bucket, a wear unit of a loading platform, a loading bucket, a digging bucket, a loading platform of a mining or construction machine.

7. A part from the group: a tooth of a loading bucket, a tooth of a digging bucket, a wear unit of a bucket, a wear unit of a loading platform, a loading bucket, a digging bucket, a loading platform of a mining or construction machine, characterized in that it includes a device according to claim 1.

8. Device according to claim 2, characterized in that said grooves are positioned along a line adjacent each other on the surface of the wear protection structure.

9. Device according to claim 2, characterized in that it includes a first group of essentially parallel first grooves, the extension of which forming an angle to essentially parallel second grooves belonging to a second group.

10. Device according to claim 2, characterized in that it is included in a part from the group: a tooth of a loading bucket, a tooth of a digging bucket, a wear unit of a bucket, a wear unit of a loading platform, a loading bucket, a digging bucket, a loading platform of a mining or construction machine.

\* \* \* \* \*